US007566831B2

(12) United States Patent
Holland

(10) Patent No.: US 7,566,831 B2
(45) Date of Patent: Jul. 28, 2009

(54) COAXIAL CABLE CONNECTOR WITH INTERNAL PRESSURE SEAL

(76) Inventor: Michael Holland, 107 Via Del Cielo, Santa Barbara, CA (US) 93100

( * ) Notice: Subject to any disclaimer, the term of this patent is extended or adjusted under 35 U.S.C. 154(b) by 2 days.

(21) Appl. No.: 11/935,902

(22) Filed: Nov. 6, 2007

(65) Prior Publication Data

US 2009/0114424 A1 May 7, 2009

(51) Int. Cl.
*H02G 15/02* (2006.01)

(52) U.S. Cl. .................................. 174/74 R; 174/77 R

(58) Field of Classification Search ............... 174/74 R, 174/75 D, 77 R, 79; 439/587, 583, 584
See application file for complete search history.

(56) References Cited

U.S. PATENT DOCUMENTS 6,071,144 A * 6/2000 Tang .......................... 439/426
7,077,699 B2 * 7/2006 Islam et al. ................. 439/578
2004/0077215 A1 * 4/2004 Palinkas et al. ............. 439/578
2004/0082218 A1 * 4/2004 Stirling ...................... 439/587
2004/0219833 A1 * 11/2004 Burris et al. ................ 439/578
2004/0245730 A1 * 12/2004 Holland et al. .............. 277/602
2006/0211304 A1 * 9/2006 Holland ...................... 439/585

OTHER PUBLICATIONS

Mark up of p. 103 of Holland Electronics Catalog. Shows GHT Series Taps. Marked to indicate diameter of neoprene port seal. Published prior to Sep. 12, 2006.

* cited by examiner

*Primary Examiner*—William H Mayo, III
(74) *Attorney, Agent, or Firm*—Ocean Law; Paul D. Chancellor

(57) ABSTRACT

A coaxial cable connection includes male and female parts and utilizes one or more of a pressure seal and a spring lock. In some embodiments a non-metallic gasket suitable for forming a pressure seal is included and in some embodiments a spring having a suitable modulus of elasticity is included.

5 Claims, 10 Drawing Sheets

Axial Compression Port Seal

500d

600

1100

COAXIAL CABLE CONNECTOR WITH INTERNAL PRESSURE SEAL

BACKGROUND OF THE INVENTION

1. Field of the Invention

The present invention relates to a pressure seal for a coaxial cable connection utilizing F-Type connectors.

2. Discussion of the Related Art

Signal quality in systems employing coaxial cable is adversely affected when moisture from the environment enters the region bounded by coaxial cable end connectors. The vehicle transporting moisture from the environment into the cable is ambient air. Where this gas exchange is stopped, the transport of moisture into the cable is prevented.

The ingress of moisture into the coaxial cable is primarily due to the pressure changes in small air pockets disposed within the cable during ambient temperature changes. Variations in ambient temperature cause ambient air and the moisture it carries to be drawn into the coaxial cable. Both the moisture and the eventual corrosion of conductors inside the cable, especially the shield conductors, degrade signal quality. Where outdoor coaxial cable connections are concerned, it has become customary to seal F-Type connectors to the cable and to seal the interconnections between male and female connector parts.

The F-Type connector-to-coaxial cable, and F male-to-female connector interface have four places where moisture may enter the interconnection. The points of moisture entry are the interface between: (a) the trailing end of the male connector and the cable 60; (b) the connector shell and the connector body 61; (c) the swivel nut and the connector body 62; and (d) the swivel nut and the F-Type female connector on the device being connected 63. The foregoing principal sites of water vapor ingress are illustrated in FIG. 1.

Strong industry focus on cable to connector seals has resulted in several designs gaining acceptance in the industry as means for sealing the first three moisture ingress locations mentioned above.

However, no such industry focus on connector to connector pressure seals has occurred. And, to the extent that connector to connector pressure seal solutions have been developed, they are external seals. Moreover, no industry accepted design that effectively seals the last interface (i.e., the interface between the swivel nut on the male F-Type connector and the female F-Type connector on the device being connected) is available.

In accordance with the prior art, the leading end of the internally threaded nut on the male F-Type connector, which is attached to the cable, is screwed on to the female F-Type connector which has a mating outside thread. The integrity of the interface between the male and female F-Type connectors controls the mechanical and electrical performance of the connection. The thread used on F-Type connectors is a course ⅜-32 thread, specified by the SCTE (Society of Cable Television Engineers) and the EIA (Electronics Industry Association). This metal threaded interface does not provide an effective pressure seal for blocking gas exchange between the environment and the interior of the cable connection.

Known methods for preventing moisture ingress at connector to connector interfaces exist as shown in FIGS. 2_a-e_. All of these methods involve the use of external seals. In the case of the devices shown in FIGS. 2_a-d_, the illustrated device works only in particular applications. The device of FIG. 2_e_ is somewhat more useful.

None of the prior art devices of FIGS. 2_a-d_ provide an adequate seal between the nut on a male F-Type connector and the threaded shaft of a female F-Type connector which has threads on the exterior of the shaft. With reference to FIG. 2_a_, a rubber boot 10 is employed in accordance with the prior art to form a seal between a cable 11 and a ridge 12 that sometime exists on the female F-Type connector 13 mounted on the device 14 being connected to. The rubber boot 10 may keep out some moisture but does not provide a seal that is tight. Further, the device relies on the presence of a sealing ridge 12 on the female connector which is usually absent.

With reference to FIG. 2_b_, air shrink tubing 40 is also employed in the art to provide a seal between the cable 11 and the F-connector 13. Heat shrink tubing cannot be used because the PVC on the coaxial cable jacket will melt. The air shrink tubing 40 presents an inwardly-directed (radial) sealing force but requires a minimal length of the female F-Type connector shaft to be exposed in order to provide a water seal. In addition, the shaft must have a smooth surface. The tubing will not shrink into the threads of the female connector. Therefore this method has a limited application; being operable only for a female F-Type connector having a smooth, unthreaded outer surface on the shaft thereof.

Another sealing technique, though not widely used, is to fill the male connector nut with a silicone grease prior to attachment of the nut to the shaft of the female F-Type connector which will fill the area between threads. This is not recommended due to the difficulty in applying the correct amount of grease as well as the problem of removal and hand cleaning.

Yet another sealing technique, the axial compression port seal 20, is illustrated in FIGS. 2_c_ and 2_d_. The axial compression port seal 20 consists of a tubular elastic member that slides over the shaft 21 of the female F-Type connector. When axial pressure from tightening the male nut 22 compresses the elastic device 20, the opposing end of the device exerts an equal force on a bulkhead 23 and thus seals both sides as it compresses. This device 20 and method works well if all sizes are exactly correct for the length of the shaft 21.

In practice, with many products being used, this method becomes ineffective. In addition, the axial compression port seal 20 relies on the axial force it exerts on a bulkhead in order to provide a seal. In many devices, this bulkhead does not exist. When an axial compression port seal 20 is used over threads, it cannot exert the needed inward radial force to fill and occlude the thread and pressure seal from its own elasticity. The radial sealing ability of axial compression port seals 20 has been limited due to the need for the installer to slide it over the cylindrical shaft of the female F-Type connector with little effort.

FIG. 2_e_ shows the sealing design of U.S. Pat. No. 6,929,265 B2. Here, a compression ring 80 is advanced along an underlying elastic sealing member 90 when the abutting nut of a male connector is advanced along the threaded portion of a female connector 130. Seals made by this technique include the forward seal between the female connector and the elastic sealing member, the rear seal between the nut and the compression ring, and the seal between the elastic sealing member and the compression ring.

In summary, for the designs of FIGS. 2_a-d_, due to the variety of female connector port lengths, finishes, thread lengths, and the lack of clean, machined bulkheads for axial compression that are currently available on devices being used, it has been almost impossible to achieve moisture ingress protection. Even when a machined bulkhead is available for an axial compression seal, the seal must be sized for the exact length of the female port and male nut so that the proper axial force can be achieved when the male connector is fully screwed in. These three components may be sized correctly to resist moisture ingress for one set of products; but, the non-standardization of device dimensions used in the field make it highly improbable that each of these four variables (male nut depth; female shaft length; machined flat bulkhead; and axial rubber seal length) will be sized correctly in any particular installation. The design of FIG. e is an improvement, but it remains an external design that has not been widely adopted by the industry.

SUMMARY OF THE INVENTION

In an embodiment, the present invention provides an internal pressure seal for protecting the a male F-Type coaxial connector from moisture. In the prior art, some female F-Type connectors have included gaskets designed to protect the female connector from moisture. Unlike the prior art, the present invention provides an internal pressure seal for protecting the male connector from moisture. The internal pressure seal of the present invention functions, inter alia, to prevent harmful moisture from reaching coaxial cable parts enclosed by a mandrel of a male F-Type connector. Included in the present invention is a sealing device for coaxial cable connections utilizing F-Type connectors and including a male F-Type connector for connecting RG-6 Series 6 type ("RG-6"), or smaller, coaxial cable.

The internal pressure seal embodiment comprises a female F-Type port including a port tube having a port tube face; a non-metallic gasket suitable for forming a pressure seal extending from the port tube face; the gasket having a central passage dimensioned for receiving a central conductor of an RG-6 or smaller coaxial cable therethrough without sealing around the central conductor; a forward face of the gasket about perpendicular to an axis of the central passage, said forward face having an inner diameter greater than about five (5) millimeters and an outer diameter greater than the inner diameter; and, the gasket operable to be compressed by a mandrel of an F-Type connector for connecting an RG-6 or smaller coaxial cable being mated with the port and the forward face operable to seal against a face of said mandrel.

In another embodiment, the present invention provides an internal spring incorporated in a spring lock for preventing loosening of mated male and female F-Type coaxial cable connectors. A spring lock for a coaxial cable connector comprises a female F-Type port including a port tube having a port tube face; a spring having a suitable modulus of elasticity and a central passage dimensioned for receiving a central conductor of an RG-6 or smaller coaxial cable therethrough without sealing around the central conductor; the spring extending from the port tube face, said spring having an inner diameter greater than about five (5) millimeters; the port tube face operable to abut the face of a mandrel of a male connector being mated with the port, said male connector being an F-Type connector for connecting RG-6 or smaller coaxial cable and the spring operable to be compressed by the mandrel; and, rotation of a male connector mated with a female connector being resisted by spring forces tending to bind the threads a male connector nut to the threads of a female port tube.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

DETAILED DESCRIPTION OF THE PREFERRED EMBODIMENTS

The disclosure provided in the following pages describes examples of some embodiments of the invention. The designs, figures, and description are non-limiting examples of certain embodiments of the invention. For example, other embodiments of the disclosed systems and methods may or may not include the features described herein. Moreover, disclosed advantages and benefits may apply to only certain embodiments of the invention and should be not used to limit the disclosed inventions.

Figure 3:
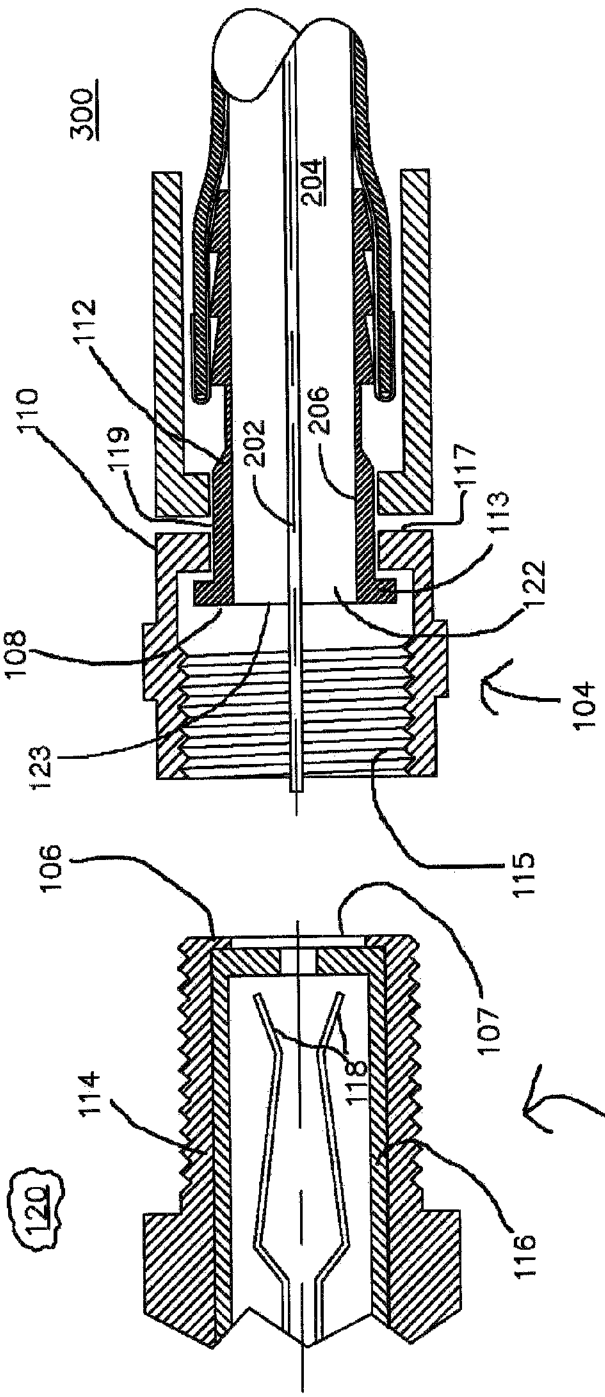
FIGURE 3 PRIOR ART
FIG. 3 is a cross-sectional diagram of a prior art coaxial cable connection including male and female F-Type connectors.

As can be found in the prior art, FIG. 3 shows parts of a coaxial cable connection 300 including a female F-Type connector or port 102 and a male F-Type connector 104. The male connector includes a mandrel or tube 112 and in some embodiments a nut 110. The nut includes a threaded bore 115 adjacent to a partially closed end 117 having a central opening 119. The mandrel passes through the central opening and a rim extending from the mandrel's outer diameter at one end 113 rotatably engages the partially closed end. Note that for clarity, only a portion of the coaxial cable is shown in FIG. 3; see also FIG. 4.

Figure 4:
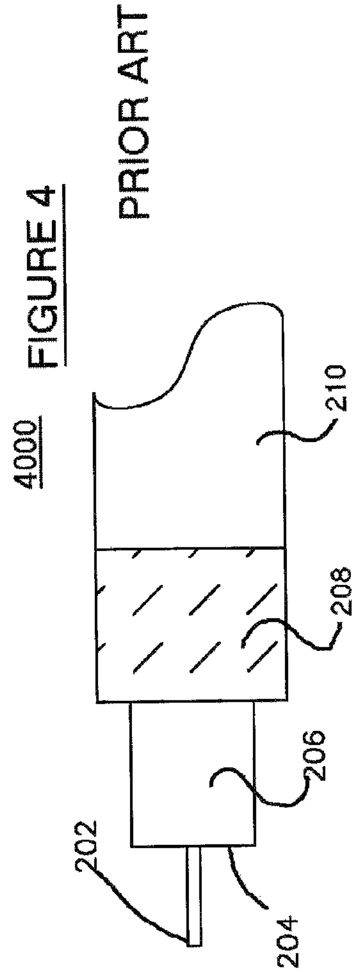
FIGURE 4 PRIOR ART
FIG. 4 is a diagram of a prepared end of a coaxial cable.

FIG. 4 shows a prepared end of a prior art RG-6 coaxial cable 400. The coaxial cable includes conductors and dielectric insulators. In an embodiment, three conductors and two dielectric insulators are used. A central conductor 202 is separated from a foil conductor 206 by an inner dielectric insulator 204. A braided conductor 208 overlies the foil conductor and a second dielectric insulator 210 provides an outer jacket. As shown in FIG. 3, the mandrel of the male connector 112 receives the central conductor, inner dielectric insulator and foil conductor. The inside diameter of a mandrel for use with RG-6 coaxial cable is in the range of about 4.75 to approximately 5.0 millimeters.

The port 102 includes an outer electrically conductive tube, an inner insulating cylinder 116 and a contact 118. In some embodiments, the outer tube is threaded (as shown). A center conductor 202 of a coaxial cable 200 is, in an assembled connection, in electrical continuity with the contact of the port and the other conductors of the coaxial cable are, in an assembled connection, in electrical continuity with the outer tube of the port.

During assembly of the connection, the nut 110 is advanced onto the port 114 and a face 106 of the port tube 114 approaches and finally comes into contact with a face 108 of the mandrel 112. This metal-to-metal contact is desirable. However, neither the threaded connection nor the metal-to-metal contact provide a pressure seal adequate for preventing the exchange of gasses between the environment 120 and the interior of the connection 122.

FIGS. 5*a-d* show various prior art female F-Type connectors or ports 500*a-c*. These designs may provide limited moisture protection for the female F-Type connector. But, none of these designs assure RF signal quality while protecting the mating male connector from moisture because, inter alia, none of these prior art designs includes a suitable pressure seal isolating the internals of the male connector 122 from the environment 120.

Figure 5A:
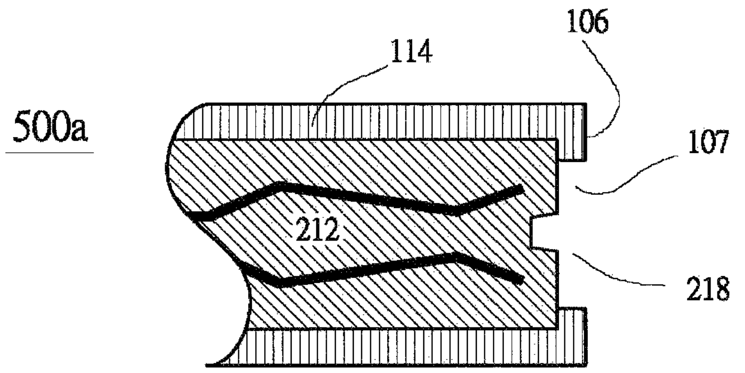
FIGS. 5*a-d* are diagrams of prior art designs of female F-Type connectors.

The connector configuration shown in FIG. 5*a*, provides only minimal protection against moisture entering a female F-Type connector. Here, a female F-Type connector 500*a* has a connector insert 212 inserted in a conductive port tube 114 having a aperture 107 at one end. In various embodiments, the connector insert has a cavity, is hollow or is solid. In an embodiment, the connector insert is an insulating cylinder. In the present invention, the connector insert is fixed to the port tube so as to prevent movement of the connector insert along the length of the port tube. In an embodiment, the connector insert is fixed to an inside wall 312 of the port tube. When mated with a male F-Type connector (see FIG. 3 discussed above), the center conductor of a coaxial cable 202 is received by a hole in the connector insert 218 and the face of the female connector 106 comes into contact with the face of a male connector mandrel 108. As discussed above, this metal-to-metal interface does not provide a pressure seal suitable for protecting the male connector from moisture.

Figure 5B:
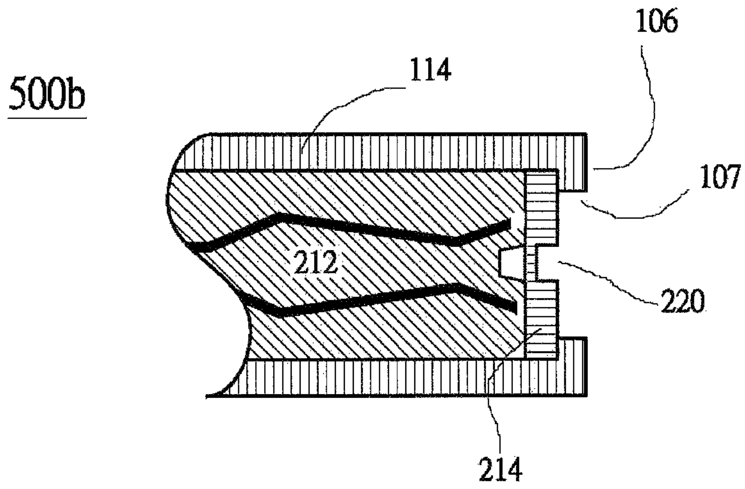

The connector configuration shown in FIG. 5*b*, is designed to provide additional protection against moisture entering a female F-Type connector. Here, a female F-Type connector 500*b* has a gasket of substantially uniform thickness 214 and a connector insert 212 inserted in a conductive tube 114 having an aperture 107 at one end. The gasket is adjacent to the aperture. When mated with a male F-Type connector (see FIG. 3 discussed above), the center conductor of a coaxial cable 202 is received by a receiving area of the gasket 220, such as a hole or a diaphragm, and the face of the female connector 106 comes into contact with the face of a male connector mandrel 108. As discussed above, this metal-to-metal interface does not provide a pressure seal suitable for protecting the male connector from moisture.

Figure 5C:
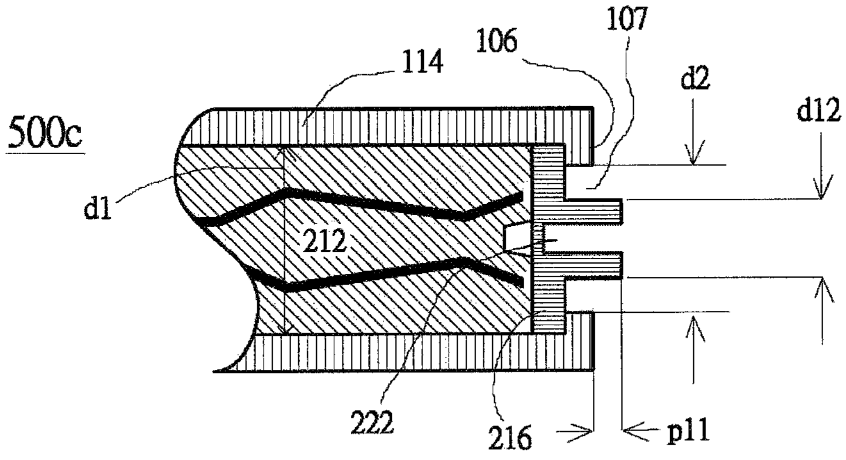

The connector configuration shown in FIG. 5*c* is designed to provide additional protection against moisture entering an unused female F-Type connector. Unused means that no male connector is attached to the female connector. Here, a female F-Type connector 500*c* has a gasket with a central extension 216 and a connector insert 212 inserted in a conductive tube 114 having an aperture 107 at one end. The gasket is adjacent to the aperture and the gasket extension projects into the aperture. The gasket extension has an outer diameter of d12 which is less than the aperture diameter d2 and which is less than five (5) millimeters.

Figure 9:
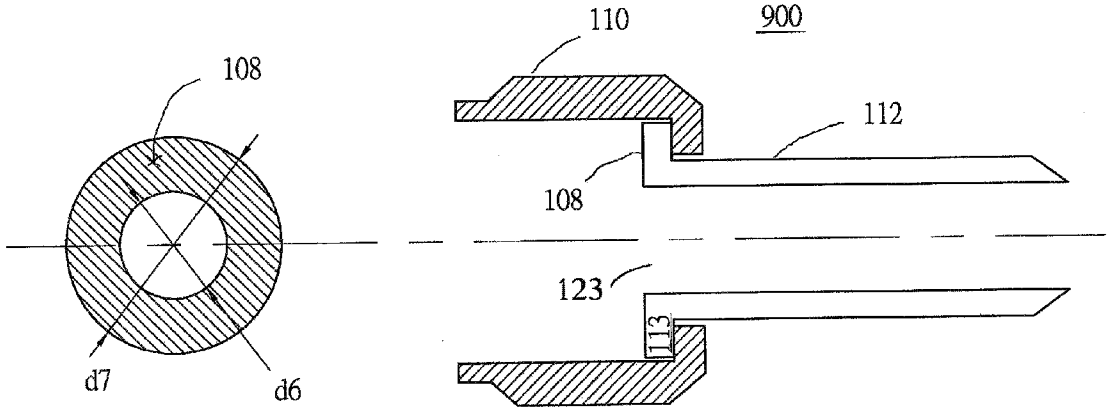
FIG. 9 is a cross-sectional diagram of a nut and mandrel of FIG. 6.

With continued reference to FIG. 5*c*, the extension diameter d12 is less than the inner diameter of the mandrel of the male connector d6 (See FIG. 9). Where the gasket extension protrudes p11 from the face of the female connector 106, the interior of the mandrel 122 (See FIG. 10) envelops the protruding portion of the gasket extension. When mated with a male F-Type connector (See FIG. 3 discussed above), the center conductor of a coaxial cable 202 is received by a hole in the gasket 222 and the face of the female connector 106 comes into contact with the face of a male connector mandrel 108. As discussed above, this metal-to-metal interface does not provide a pressure seal suitable for protecting the male connector from moisture. Further, because inside diameter of the mandrel is larger than the outside diameter of the gasket extension, no pressure seal is formed by the gasket extension.

Figure 5D:
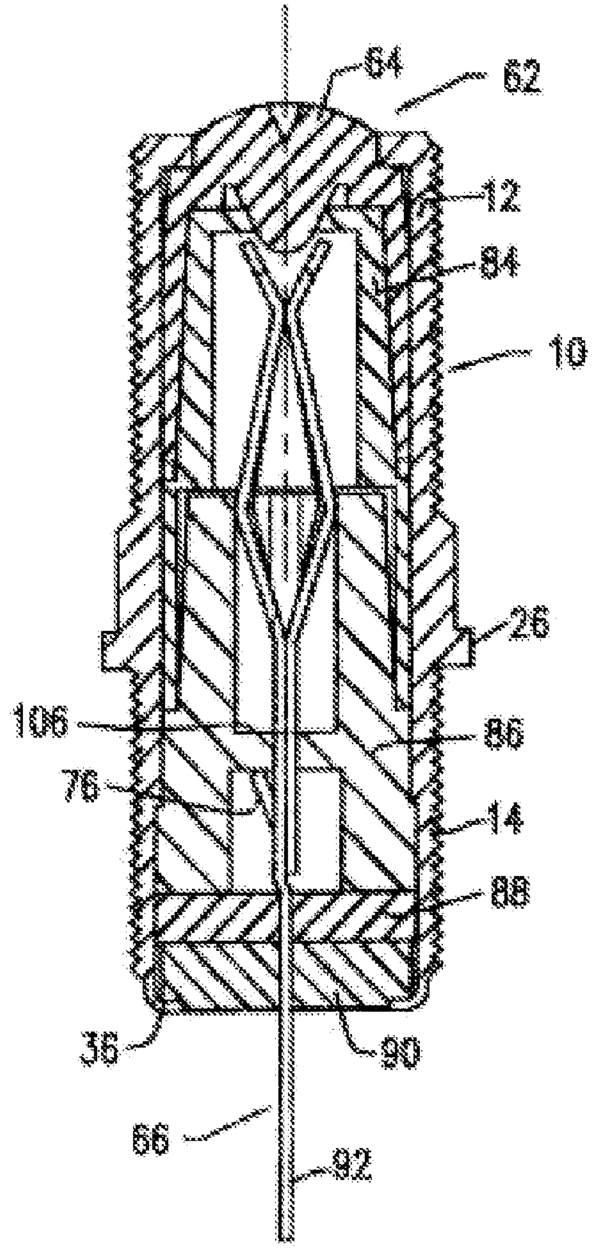
FIGURE 5d Prior Art

FIG. 5*d* shows a prior art hermetically sealed female F-Type connector 500*d* disclosed by Tang in U.S. Pat. No. 6,071,144 filed Aug. 5, 1999. Tang teaches the protection of the internals of a female F-Type connector by providing a hermetically sealed female connector housing 10 utilizing a boot 64 to seal a first end of the housing and washers 88, 90 to seal a second end of the housing. At the boot end, a seal is maintained when a coaxial cable center conductor extends from a male F-Type connector and pierces a rubber material of the boot. At the washer end, a seal is maintained where a clip conductor pierces the rubber washer. Among other things, Tang's invention relies upon the motion of a plastic cap 28 relative to the port tube 12 in order to expand the boot into which a conical end of the plastic cap is inserted. And, Tang's invention requires, among others, two seals including one seal where the coaxial cable center conductor pierces the boot at the female connector aperture 11 and another seal where the clip pierces the washer. Tang does not teach a) sealing male F-Type connectors, b) seals that operate without contacting conductors or c) protruding aperture end seals do not press against dielectric of a cable incorporating the center conductor.

Therefore, no one of these prior art female F-Type connectors assures RF signal quality while providing a pressure seal suitable for protecting the male connector from moisture.

In yet other examples of the prior art, O-Rings tending to space apart the mandrel face 108 and the female port face 106 have been used. However, such O-Ring type seals may cause poor metal-to-metal contact of the mandrel and port faces resulting in degraded RF signal quality.

Figure 6:
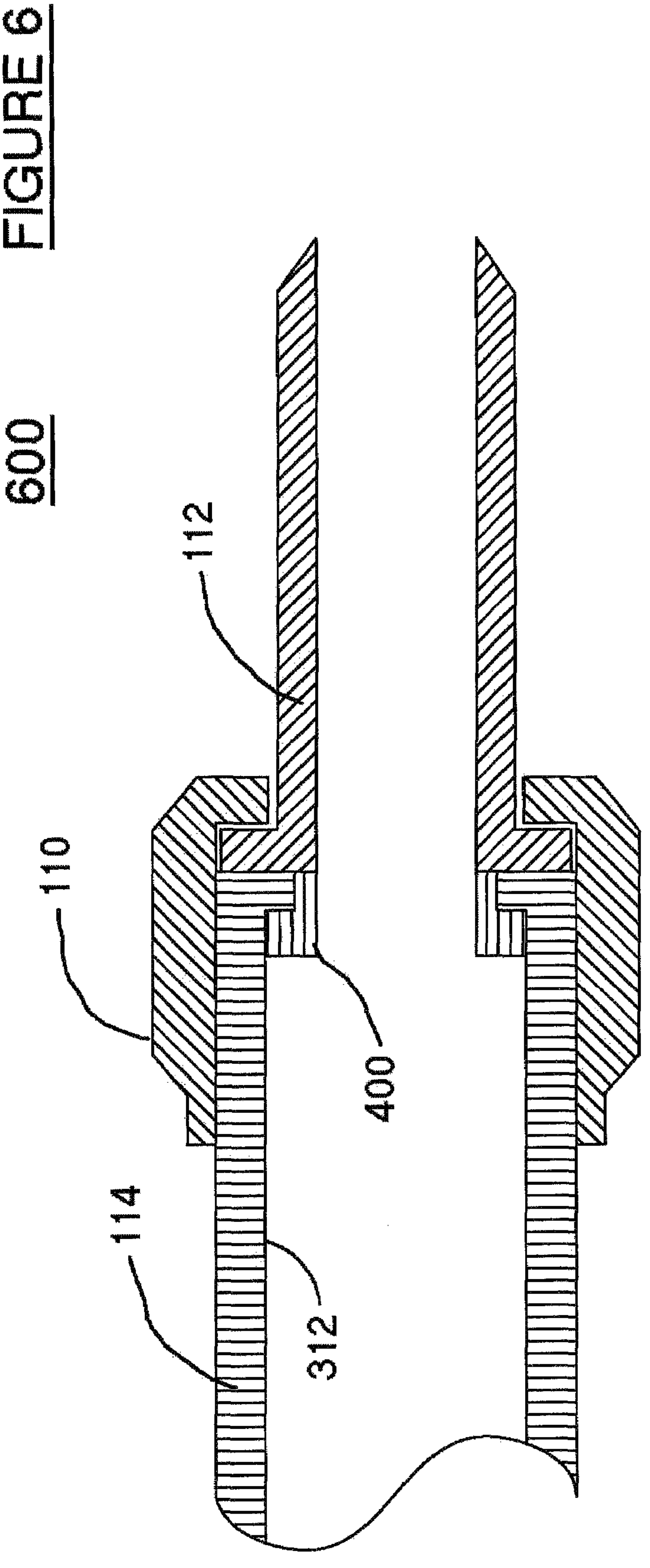
FIG. 6 is a cross-sectional diagram of an F-Type connection in accordance with the present invention.

FIGS. 6-10 illustrate one or more devices or parts of devices in accordance with the present invention. FIG. 6 shows an F-Type connection 600. A metallic male connector part or mandrel 112 abuts a metallic female connector part or port tube 114 and a gasket 400, substantially contained in an assembled connection by the female connector part, abuts the mandrel.

Figure 7A:
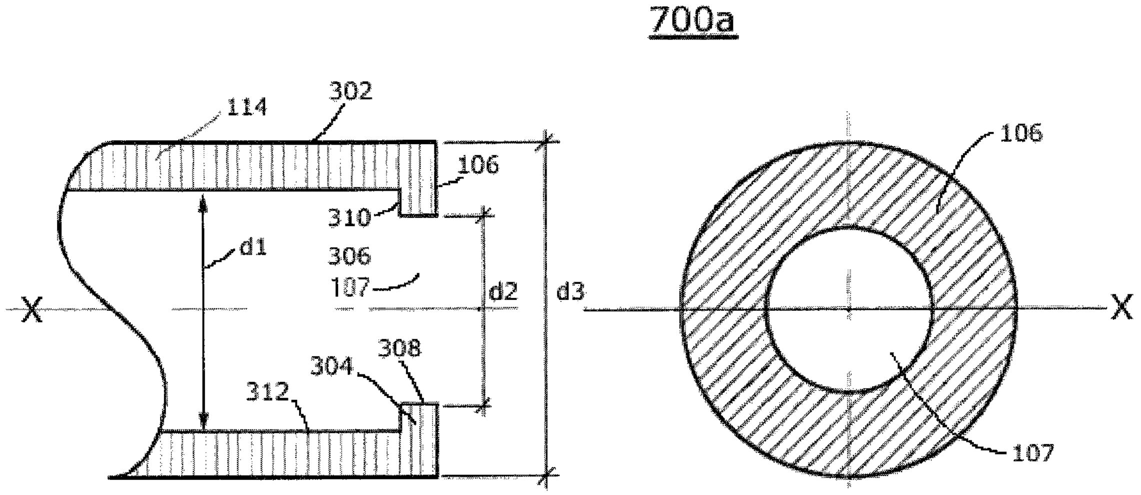
FIG. 7*a* is a cross-sectional diagram of a metallic tube of a female F-Type connector of FIG. 6.

FIG. 7*a* shows a part of a female connector part or port 700*a*. The outer tube of the port 114 has an inner diameter of d1 and an end 302 supporting an inwardly directed rim 304. A port end-face 106 surrounding a central aperture 107 is defined by the rim and lies in a plane about normal to an axis of the tube x-x. In an embodiment, the face is substantially annular in form with an inner diameter of d2 and an outer diameter of d3.

Figure 7B:
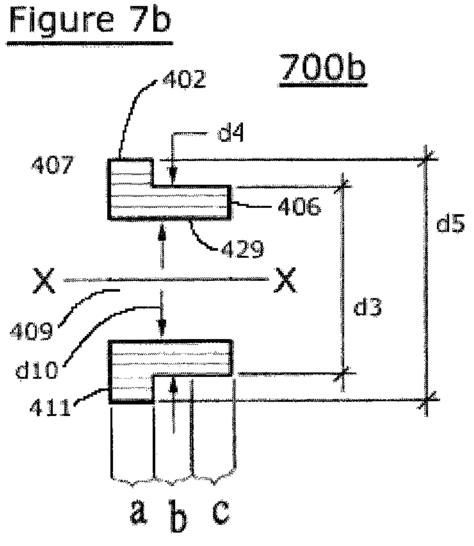
FIG. 7*b* is a cross-sectional diagram of a first gasket of FIG. 6.

FIG. 7*b* shows one gasket 700*b* suitable for forming a pressure seal. The gasket comprises a generally a plug-like body 411 with a center conductor passage 409. Gaskets suitable for forming a pressure seal may have variously shaped forward faces 406. For example, a forward face may be in the shape of a polygon, circle, oval or another geometric shape capable of forming a seal around an opening in the face of the mandrel 123.

Although the gaskets of the present invention are located within an assembled F-Type connection, use of a non-metallic gasket allows the transmission of RF signals without distortion or attenuation. Suitable materials for such gaskets are non-metallic materials substantially impervious to air at ambient temperatures and pressure differences of a magnitude arising from ambient temperature and/or pressure changes. These materials include suitable synthetic or non-synthetic materials such as elastomers including rubber, plastics, polymers and fluropolymers. For example, a suitable neoprene material may be used.

Figure 8:
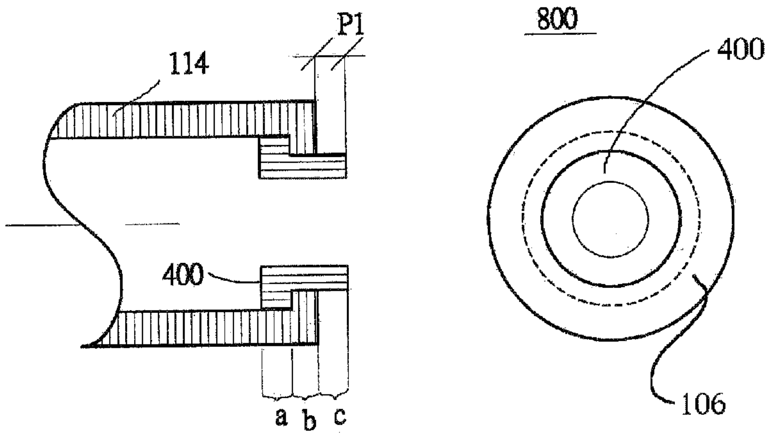
FIG. 8 is a cross-sectional diagram of a metallic tube of a female F-Type connector and a gasket of FIG. 6.

As shown in FIG. 8, a port connector 800 includes a gasket. A section of the gasket "c" protrudes a distance p1 from the aperture 107 prior to being compressed by the mandrel of a male connector 112 (see also FIG. 10) during connector assembly. At least a portion of gasket section "c" has an outer diameter d3 larger than the inside diameter of the mandrel d6 (See also FIG. 9) to provide for an abutment of a forward gasket face 406 and the mandrel face 108. A center conductor passage 409 along a longitudinal axis of the gasket x-x is suitably designed to receive a central conductor of a coaxial cable 202.

Because deformation of the cable 4000, in particular deformation of the center conductor 202, may prevent proper mating of male and female connectors 104, 102 and/or adversely affect transmission of RF signals, in an embodiment gaskets of the present invention include a central passageway dimensioned d10 to provide an annular gap between the center conductor 202 and the wall of the center conductor passage 429. And, in an embodiment, gaskets of the present invention do not seal around a coaxial cable's center conductor. The presence of a gap and/or the absence of a seal reduces and or eliminates gasket forces on the center conductor.

Further, because deformation of the cable 4000, in particular deformation of the dielectric 204, may prevent proper mating of the male and female connectors 104, 102 and/or adversely affect transmission of RF signals, in an embodiment gaskets of the present invention do not contact the dielectric in an assembled connection. For example, where center conductor passage 409 has a diameter d10 greater than the diameter of the mandrel bore d6 (see FIG. 9) there is no contact between the forward face of the gasket 406 and the dielectric 206 of the cable in an assembled connection.

In an embodiment, at least one section of the gasket has an outer diameter d4 chosen to create an interference fit with a side wall of the port tube rim 308 (d4>d2). In an embodiment, the gasket includes a first section "a" having a first diameter d5, a second section "b" having a second diameter d4 and a third section "c" having a diameter d3.

Figure 7C:
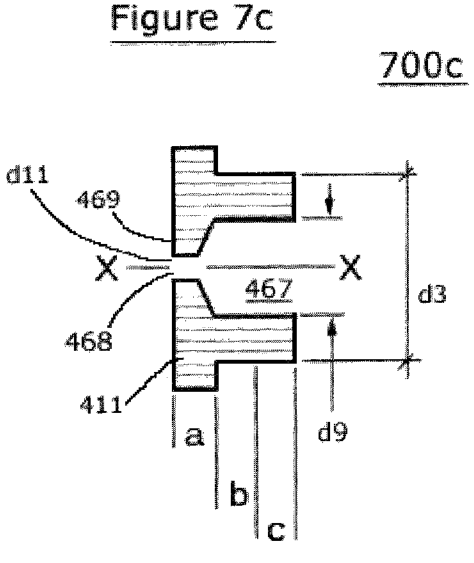
FIG. 7*c* is a cross-sectional diagram of a second gasket of FIG. 6.

FIG. 7*c* shows another gasket 700*c* suitable for forming a pressure seal. The gasket comprises a generally plug-like body 411 with a central cavity 467. Similar to the gasket above, a section of the gasket "c" is compressed by the mandrel of a male connector 112 during connector assembly and gasket section "c" has an outer diameter d3 larger than the inside diameter of the mandrel d6 to provide for an abutment of a forward gasket face 406 and the mandrel face 108. In various embodiments, the diameter of the mouth of the cavity d9 is chosen to exceed five (5) millimeters such that the entirety of the forward face of the gasket abuts the mandrel face. The central cavity 467 of the gasket and an opening 468 in a backwall 469 of the cavity provide a passage for the central conductor of a coaxial cable 202. Each of the cavity diameter d9 and the backwall opening diameter d11 exceed the outer diameter of the conductor to be inserted therethrough 202 such that an annular gap separates the conductor from the gasket. This gap ensures that no forces are exerted on the center conductor by the gasket.

As shown in FIG. 8, a gasket is inserted in a port tube 800 of a female F-Type connector. Any of the gaskets of the present invention herein described, including the gaskets of FIGS. 7*b* and 7*c*, may be used in various embodiments of the present invention. As an exemplary embodiment, FIG. 8 includes a gasket similar to the gasket of FIG. 7*b*. As can be seen, section "a" of the gasket is within the port tube 114, section "b" of the gasket is surrounded by a rim of the port tube 304 and section "c" of the gasket projects a distance p1 from the aperture into a space outside the port tube. In some embodiments the diameter d5 of gasket section "a" is chosen to be larger than the aperture diameter d2 to resist passage of the first gasket section "a" through the aperture 107. And, in some embodiments, the diameter of the gasket section "a" d5 is chosen larger than the inner diameter of the port tube d1 to create an interference fit between a periphery of section "a" 402 and an inner diameter of the port tube d1.

FIG. 9 shows parts of a male F-Type connector 900. A mandrel 112 is inserted in a nut 110 and a rim of the mandrel 113 is rotatingly engaged with a partially closed end of the nut 110. The rim of the mandrel forms an annular face 108 having an inside diameter d6 and an outside diameter d7. In an assembled connector, at least a portion of the face of the mandrel 108 comes into contact with at least a portion of the face of the port tube 106.

Figure 1:
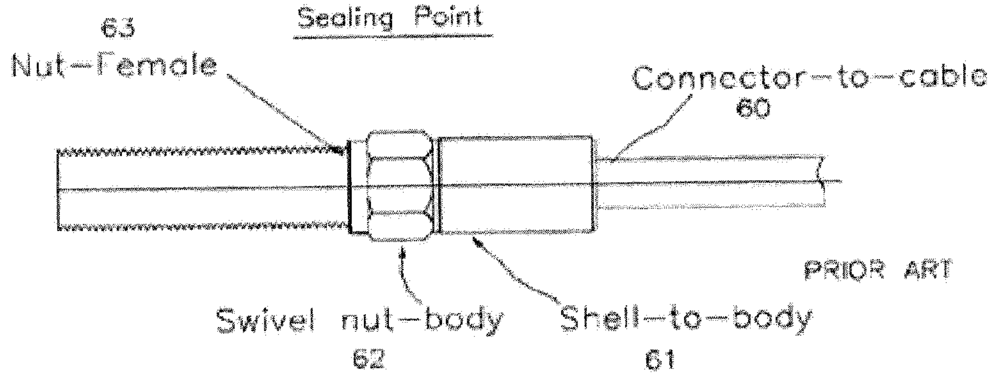
FIG. 1 is a diagram of a prior art coaxial cable connection including male and female F-Type connectors.
Figure 2A:
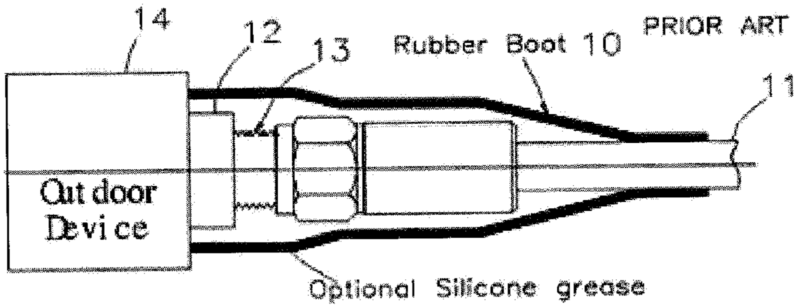
FIGS. 2*a-e* are diagrams of prior art designs for sealing an interface between male and female F-Type connectors.
Figure 2B:
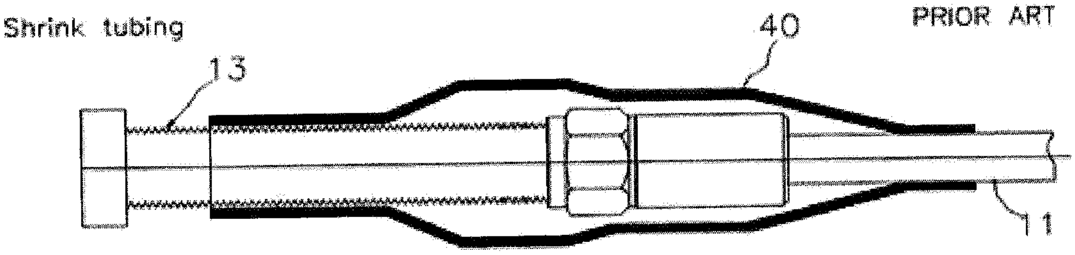
Figure 2C:
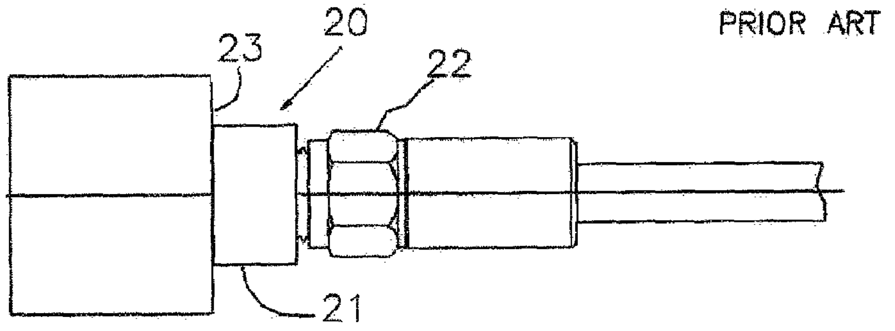
Figure 2D:
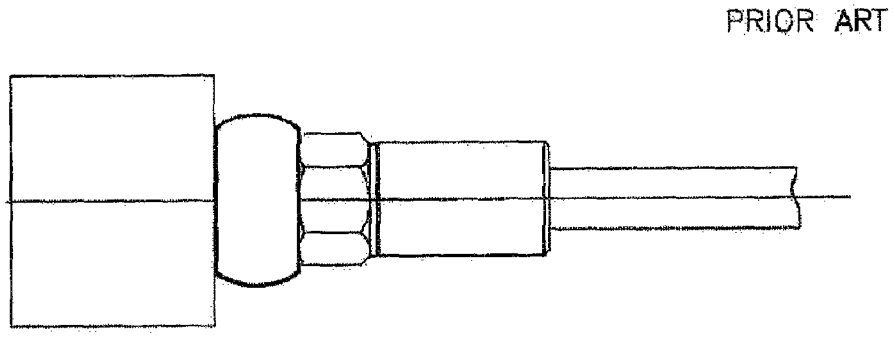
Figure 2E:
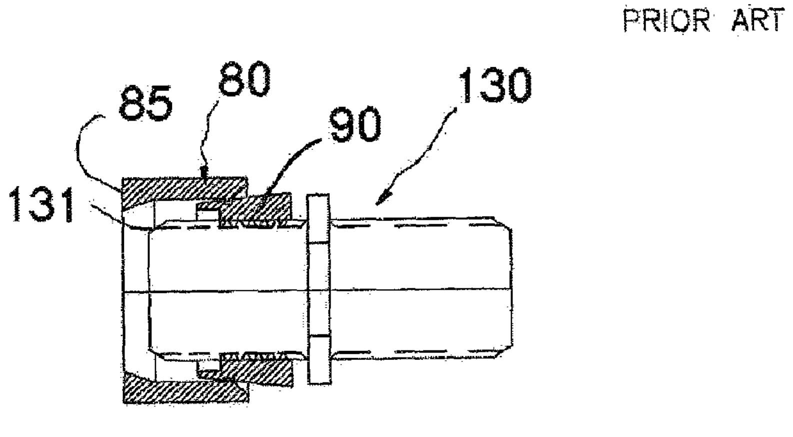
Figure 10:
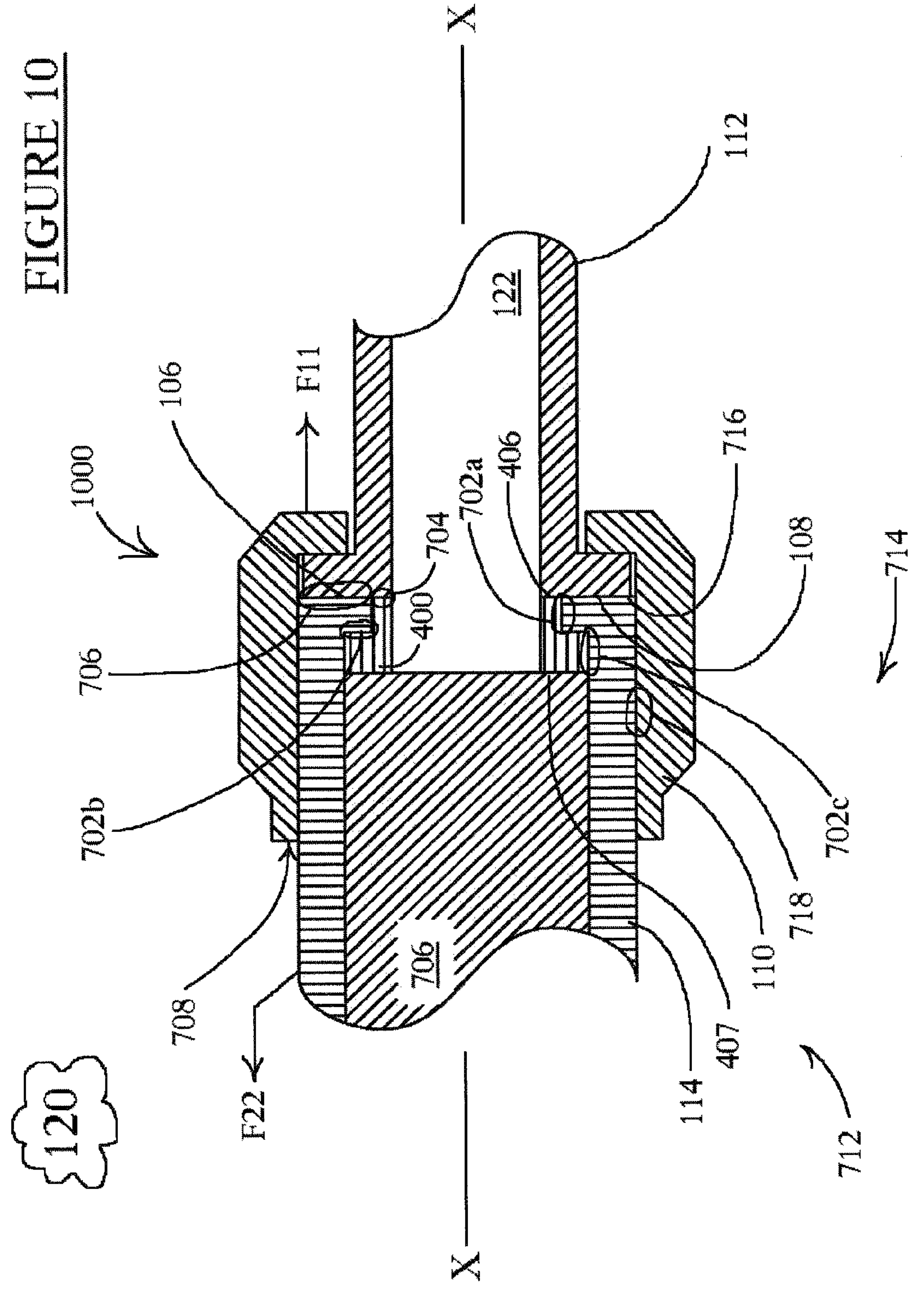
FIG. 10 is a cross-sectional diagram of a first F-Type connection of FIG. 6.

FIG. 10 shows an assembled connection 1000 incorporating a structure in accordance with the present invention. Any of the gaskets of the present invention herein described, including the gaskets of FIGS. 7*b* and 7*c*, may be used in various embodiments of the present invention. As an exemplary embodiment, FIG. 10 includes a gasket similar to the gasket of FIG. 7*b*. For clarity, the coaxial cable has not been shown. Here, a face of the mandrel 108 presses against at least a portion of a forward face of the gasket 406 and an opposing face of the gasket 407 presses against a backing structure within the bore of the port tube 706. In an embodiment, this backing structure is an insulating tube similar to the insulating tube 116 described in FIG. 1. In other embodiments, the backing structure is a backing washer or a similar part. In an alternative embodiment, where no backing structure is required, interference of the periphery of section "a" of the gasket 400 and the inside diameter of the port tube 312 resists movement of the gasket relative to the port tube.

In operation, the gasket 400 provides a pressure seal that prevents the exchange of gasses between the interior of the connection such as the interior of the cable connected by the male connector 122 and the environment 120. Prior to being mated with a male connector, a gasket 400 protrudes a distance p1 from an aperture 107 of a female/port connector 102. In various embodiments: a peripheral surface of a section of the gasket "b" seals against a side wall of the aperture 308 forms a radial seal 702*a*; a shoulder of the gasket between sections "b" and "c" forms an axial seal 702*b* with an inner surface of the port rim 310; and, a peripheral surface of a section of the gasket "a" forms a radial seal 702*c* with the interior of the port 312.

During assembly of a male connector 714 onto a female connector 712, a mandrel of the male connector 112 is advanced toward a face of the female connector 106. As advancement reduces a gap 716 between the mandrel face 108 and the female connector face, a forward face 406 of the gasket comes into contact with the mandrel face 108 forming an annular seal 704.

In an embodiment, advancement of the mandrel 112 is completed when the forward face of the gasket 406 is about flush with the face of the female connector 106 such that the face of the mandrel 108 comes to rest against the face of the female connector 106.

One or more paths for gas exchange between the environment 120 and the interior of the connector 122 are blocked by the gasket seals. For example, gas entering the annular passage between the inside diameter of nut and the outside diameter of the port tube 708 is blocked from entering the mandrel 112 by the annular seal 704 and is blocked from entering the port by one or more of radial seal 702*a*, annular seal 702*b* and radial seal 702*c*.

Blocking the exchange of gas between the environment 120 and the inside of the connection 122 prevents the transfer of moisture from the environment to the inside of the connection. Keeping the inside of the connection dry improves the quality of the radio frequency signal transported by the cable and connection and increases the lifetime of the cable and connection by preventing the degradation of metallic parts including conductors of the cable and connectors.

Figure 11:
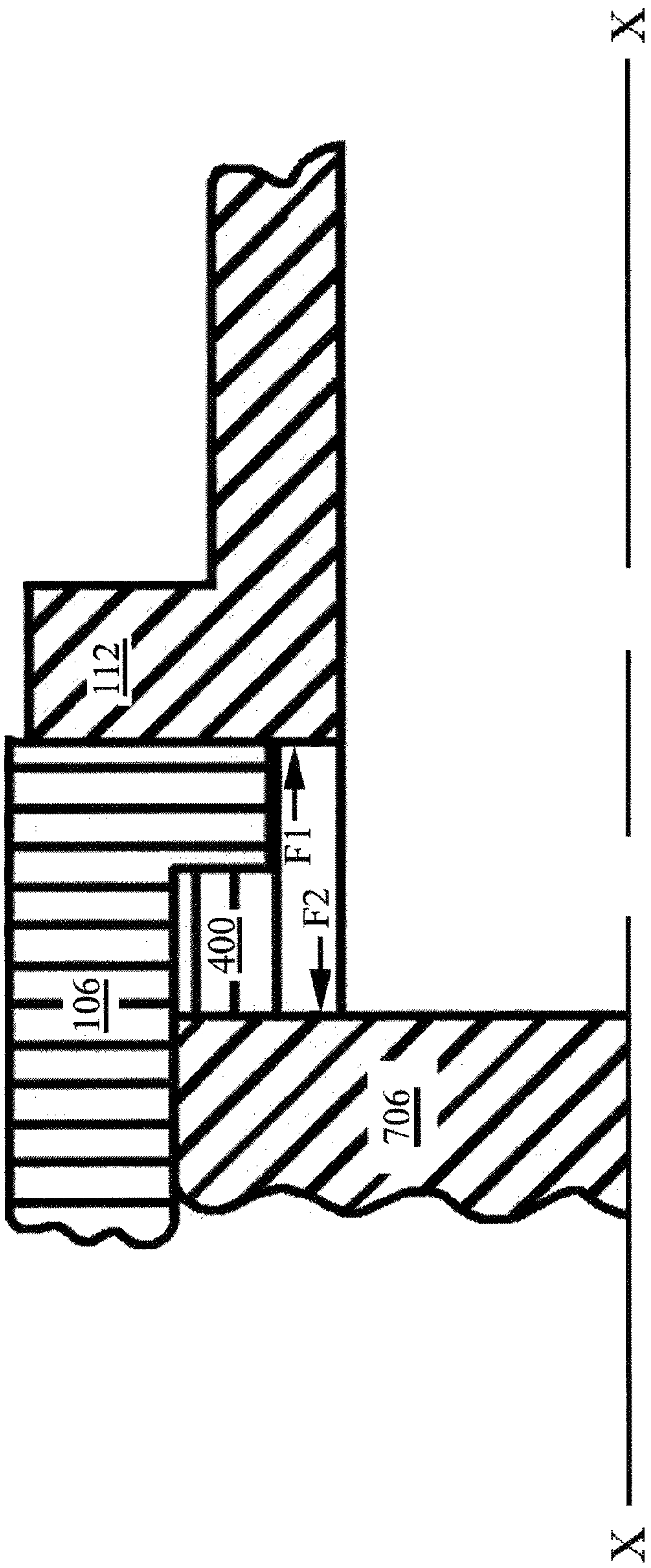
FIG. 11 is an enlargement of a portion of a first F-Type connection of FIG. 6.

Also shown in FIGS. 10 and 11 is another embodiment of the present invention 1000, 1100. Here, the element numbered 400 operates as a spring to form a spring lock tending to prevent loosening of an assembled connection caused by rotation of a male connector relative to a female connector.

A face of the mandrel 108 presses against a forward face of the gasket 406 and an opposing face of the spring 407 presses against a backing structure within the bore of the port tube 706. In an embodiment, this backing structure is an insulating tube similar to the insulating tube 116 described in FIG. 1. In other embodiments, the backing structure is a backing washer or a similar part. In an alternative embodiment, where no backing structure is required, interference of the periphery of section "a" of the spring 400 and the inside diameter of the port tube 312 (see also FIG. 6) resists movement of the spring relative to the port tube. As persons of ordinary skill in the art will recognize, any of the gasket shapes disclosed herein may be used as springs in the device of FIG. 10. Furthermore, where the spring functions only as a spring, both pervious materials and coiled structures may be used to form the spring.

Referring again to FIG. 8, a spring 400 protrudes a distance p1 from an aperture 107 of a female/port connector 102. During assembly of a male connector 714 onto a female connector 712, a mandrel of the male connector 112 is advanced toward a face of the female connector 106. As advancement reduces a gap 716 between the mandrel face 108 and the female connector face 106, a forward face of the spring 406 comes into contact with the mandrel face 108 and the spring is compressed.

In an embodiment, advancement of the mandrel 112 is completed when the forward face of the spring 406 is flush or about flush with the face of the female connector 106 such that the face of the mandrel 108 comes to rest against the face of the female connector 106.

In operation, the spring 400 resists the relative rotation of male and female connector parts. In particular, the spring resists rotation of the tube 114 relative to the nut 110. Axial forces exerted by the spring F1, F2 are transferred to the tube of the female connector F22 and to the nut of the male connector F11. These forces tend to separate the male and female connectors resulting in forces which must be borne by the threaded interconnection 718 of the tube and nut. These forces borne by the threads of the tube and nut tend to bind the threaded port in the threaded nut, preventing rotation of the tube relative to the nut.

Springs in accordance with the present invention are made from non-metallic materials and incorporate compliant materials having suitable properties including a suitable spring rate. Such materials include selected elastomers and plastics. In particular they include rubber, silicone rubber, moldable rubber and machinable rubber; and, plastics including polyurethane, moldable plastics and machinable plastics. Any one or more of these materials may be included in compositions and constructions used to make suitable springs.

In some embodiments, an element 400 may comprise both a gasket for making a seal and a spring for preventing loosening of a coaxial cable connection. Here, the material of element 400 should be impervious and have a suitable modulus of elasticity to generate forces suitable for tending to bind the threaded nut to the threaded port.

Where the term spring is used, it should be understood that the term refers to a device that may function as a pressure seal and a spring or only as a spring.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A pressure seal for a coaxial cable connector comprising:

a female F-Type port;

the port including a port tube having a port tube face;

a connector insert fixed to an inside wall of the port tube so as to prevent movement of the connector insert along the length of the port tube;

a non-metallic gasket suitable for forming a pressure seal extending from the port tube face;

the gasket having a central passage dimensioned for receiving a central conductor of an RG-6 or smaller coaxial cable therethrough;

a forward face of the gasket about perpendicular to an axis of the central passage, said forward face having an outer diameter greater than about five (5) millimeters; and, the gasket operable to be compressed by a mandrel of a male F-Type connector for connecting an RG-6 or smaller coaxial cable being mated with the port and at least a portion of the forward face of the gasket operable to seal against a face of said mandrel.

2. The device of claim 1 further comprising a second seal formed around a periphery of the gasket in contact with the port tube.

3. The device of claim 2 further comprising:

an inwardly directed rim supported by the first tube;

the rim defining a first face having a central aperture, said face located in a plane about normal to an axis of the tube;

the gasket passing through the aperture;

a first section of the gasket having an outer first diameter, said first section extending from the aperture and located within the tube;

a second section of the gasket having an inner second diameter, said second section extending from the aperture and located outside the tube; and, a middle section of the gasket located between the first and second sections of the gasket, at least a portion of said middle section engaging and forming a first pressure seal with a side-wall of the aperture.

4. A method of forming a pressure seal in a coaxial cable connection comprising the steps of:

providing a female F-Type port, the port including a port tube having a port tube face;

anchoring a gasket to the port;

dimensioning a central passage of the gasket to receive a central conductor of an RG-6 or smaller coaxial cable therethrough without sealing around the central conductor;

extending a portion of the gasket through an aperture in the port tube face, said portion including a region having an outer diameter greater than about five (5) millimeters;

compressing the gasket with a mandrel of a male F-Type connector when the male connector is mated with the port, said male F-Type connector for connecting RG-7 or smaller coaxial cables; and, sealing around a hole in the mandrel when the gasket is compressed.

5. A spring lock for a coaxial cable connector comprising:

a female F-Type port;

the port including a port tube having a port tube face;

a spring having a suitable modulus of elasticity and a central passage dimensioned for receiving a central conductor of an RG-6 or smaller coaxial cable therethrough without contacting the central conductor;

the spring extending from the port tube face, said spring having an inner diameter greater than about five (5) millimeters;

the port tube face operable to abut the face of a mandrel of a male connector being mated with the port, said male connector being an F-Type connector for connecting RG-6 or smaller coaxial cable and the spring operable to be compressed by the mandrel; and, relative rotation of mated male and female connectors being resisted by spring forces tending to bind the threads a male connector nut to female port tube threads.

* * * * *